(12) United States Patent
Kim et al.

(10) Patent No.: US 10,321,475 B2
(45) Date of Patent: Jun. 11, 2019

(54) METHOD AND APPARATUS FOR RETRANSMITTING SCHEDULING ASSIGNMENT INFORMATION IN WIRELESS COMMUNICATION SYSTEM SUPPORTING DEVICE TO DEVICE (D2D) COMMUNICATION

(71) Applicant: LG ELECTRONICS INC., Seoul (KR)

(72) Inventors: Youngtae Kim, Seoul (KR); Hanbyul Seo, Seoul (KR); Jihyun Lee, Seoul (KR); Seungmin Lee, Seoul (KR); Myoungseob Kim, Seoul (KR); Daewon Seo, Seoul (KR); Hyukjin Chae, Seoul (KR); Kijun Kim, Seoul (KR); Inkwon Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 168 days.

(21) Appl. No.: 15/126,992

(22) PCT Filed: Apr. 14, 2015

(86) PCT No.: PCT/KR2015/003712
§ 371 (c)(1),
(2) Date: Sep. 16, 2016

(87) PCT Pub. No.: WO2015/160168
PCT Pub. Date: Oct. 22, 2015

(65) Prior Publication Data
US 2018/0035447 A1    Feb. 1, 2018

Related U.S. Application Data

(60) Provisional application No. 61/978,993, filed on Apr. 14, 2014.

(51) Int. Cl.
*H04W 72/12* (2009.01)
*H04W 76/14* (2018.01)
(Continued)

(52) U.S. Cl.
CPC ....... *H04W 72/1263* (2013.01); *H04L 1/1887* (2013.01); *H04W 72/1278* (2013.01); *H04W 76/14* (2018.02); *H04W 72/02* (2013.01)

(58) Field of Classification Search
CPC ......... H04L 47/10; H04L 47/12; H04L 47/20; H04L 47/24; H04L 47/32; H04L 47/38;
(Continued)

(56) References Cited

U.S. PATENT DOCUMENTS

2007/0268848 A1   11/2007   Khandekar et al.
2016/0183276 A1*   6/2016   Marinier ............... H04W 72/02
                                                  370/329
2017/0006630 A1*   1/2017   Wang ................... H04W 76/14

OTHER PUBLICATIONS

Catt, "Resource allocation mechanism in mode 2," 3GPP TSG-RAN WG1 #76, R1-141194, Mar. 2014, 4 pages.
(Continued)

*Primary Examiner* — Dady Chery
(74) *Attorney, Agent, or Firm* — Lee, Hong, Degerman, Kang & Waimey

(57) ABSTRACT

Disclosed is a method for retransmitting scheduling assignment (SA) information between half-duplex user equipment in a wireless communication system. The method for retransmitting SA information may comprise the steps of: receiving, through a first resource area, a D2D signal including first SA information transmitted by a second user equipment, and second SA information transmitted by a third user equipment; if the target user equipment of the second SA information is the second user equipment, determining whether to retransmit the second SA information for the second user equipment; and if it is determined to retransmit
(Continued)

the second information, transmitting the second information through a second resource area.

14 Claims, 9 Drawing Sheets

(51) Int. Cl.
*H04L 1/18* (2006.01)
*H04W 72/02* (2009.01)
(58) Field of Classification Search
CPC ......... H04L 47/70; H04L 47/72; H04L 47/74; H04L 47/78; H04L 47/80; H04L 43/00; H04L 43/50; H04B 17/00; H04B 3/46; H04W 24/00
See application file for complete search history.

(56) References Cited

OTHER PUBLICATIONS

LG Electronics, "Operation in Mode 2 resource allocation for D2D communication," 3GPP TSG-RAN WG1 #76, R1-141350, Mar. 2014, 8 pages.
Ericsson, "On resource allocation for D2D Communication," 3GPP TSG-RAN WG1 #76, R1-141390, Mar. 2014, 6 pages.
Ericsson, "On Scheduling Assignments and Receiver Behaviour," 3GPP TSG-RAN WG1 #76, R1-141391, Mar. 2014, 6 pages.
Qualcomm Incorporated, "WF on Content of Scheduling Assignment," 3GPP TSG-RAN WG1 #76, R1-141802, Apr. 2014, 2 pages.
PCT International Application No. PCT/KR2015/003712, Written Opinion of the International Searching Authority dated Aug. 3, 2015, 20 pages.

\* cited by examiner

METHOD AND APPARATUS FOR RETRANSMITTING SCHEDULING ASSIGNMENT INFORMATION IN WIRELESS COMMUNICATION SYSTEM SUPPORTING DEVICE TO DEVICE (D2D) COMMUNICATION

CROSS-REFERENCE TO RELATED APPLICATIONS

This application is the National Stage filing under 35 U.S.C. 371 of International Application No. PCT/KR2015/003712, filed on Apr. 14, 2015, which claims the benefit of U.S. Provisional Application No. 61/978,993, filed on Apr. 14, 2014, the contents of which are all hereby incorporated by reference herein in their entirety.

TECHNICAL FIELD

The present invention relates to a wireless communication system, and more particularly, to a method and apparatus for supporting a D2D (device-to-device) user equipment in retransmitting scheduling assignment (SA) information in a wireless communication system supporting D2D communication.

BACKGROUND ART

Recently, with the spread of smartphones and tablet PCs and activation of high-capacity multimedia communication, mobile traffic has significantly increased. Mobile traffic is expected to double every year. Since most mobile traffic is transmitted through a base station (BS), communication service operators are being confronted with serious network load. To process increasing traffic, communication operators have installed networks and accelerated commercialization of next-generation mobile communication standards, such as mobile WiMAX or long term evolution (LTE), capable of efficiently processing large amounts of traffic. However, another solution is required to cope with greater amounts of traffic in the future.

D2D communication refers to decentralized communication technology for directly transmitting traffic between contiguous nodes without using infrastructure such as a BS. In a D2D communication environment, each node of a portable device, etc. searches for physically adjacent devices, configures a communication session, and transmits traffic. Since such D2D communication is being spotlighted as the technological basis of next-generation mobile communication after 4G due to ability thereof to cope with traffic overload by distributing traffic converging upon the BS. For this reason, a standardization institute such as 3rd generation partnership (3GPP) or institute of electrical and electronics engineers (IEEE) is establishing D2D communication standards based on LTE-advanced (LTE-A) or Wi-Fi and Qualcomm etc. have developed independent D2D communication technology.

D2D communication is expected not only to contribute to increased performance of a mobile communication system but also to create a new communication service. Further, an adjacency based social network service or a network game service can be supported. A connectivity problem of a device in a shadow area can be overcome using a D2D link as a relay. Thus, D2D technology is expected to provide new services in various fields.

In fact, D2D communication, such as infrared communication, ZigBee, radio frequency identification (RFID), and near field communication (NFC) based on RFID, has already been widely used. However, strictly speaking, it is difficult for these technologies to be classified as D2D communication for decentralizing traffic of a BS because they support only special communication purposes within a significantly limited distance (around 1 m).

According to the D2D communication, D2D user equipments can transmit and receive data therebetween without aid of a base station. In addition, such data transmission and reception may be performed using existing uplink channels. Since the D2D user equipments can transmit and receive data without intervention of the base station, a method capable of ensuring the data transmission and reception between the D2D user equipments is required. In particular, regarding data retransmission in the D2D communication, specific proposals have not been made so far.

DISCLOSURE OF THE INVENTION

Technical Task

One technical task of the present invention is to provide a method for data retransmission between D2D user equipments.

Another technical task of the present invention is to provide a method capable of ensuring data transmission at a user equipment in D2D communication.

It will be appreciated by persons skilled in the art that the objects that could be achieved with the present invention are not limited to what has been particularly described hereinabove and the above and other objects that the present invention could achieve will be more clearly understood from the following detailed description.

Technical Solutions

In a first technical aspect of the present invention, provided herein is a method of retransmitting scheduling assignment (SA) information between half-duplex user equipments in a wireless communication system, which is performed by a first user equipment, including: receiving a D2D signal containing first SA information transmitted by a second user equipment and second SA information transmitted by a third user equipment through a first resource region; if a target user equipment of the second SA information is the second user equipment, determining whether to retransmit the second SA information for the second user equipment; and if it is determined to retransmit the second SA information, retransmitting the second SA information through a second resource region.

In a second technical aspect of the present invention, provided herein is a method of retransmitting scheduling assignment (SA) information between half-duplex user equipments in a wireless communication system, which is performed by a first user equipment, including: receiving a D2D signal containing first SA information transmitted by a second user equipment and second SA information transmitted by a third user equipment through a first resource region; if a target user equipment of the second SA information is the second user equipment, determining whether to transmit an identifier of the second user equipment for the third user equipment; and if it is determined to transmit the identifier of the second user equipment, transmitting the identifier of the second user equipment through a second resource region.

In a third technical aspect of the present invention, provided herein is a first user equipment, including: a radio frequency unit; and a processor. The processor may be configured to receive a D2D signal containing first SA information transmitted by a second user equipment and second SA information transmitted by a third user equipment through a first resource region, determine whether to retransmit the second SA information for the second user equipment if a target user equipment of the second SA information is the second user equipment, and retransmit the second SA information through a second resource region if it is determined to retransmit the second SA information.

Advantageous Effects

According to embodiments of the present invention, it is possible to ensure data transmission and reception in a D2D communication system.

Moreover, according to the embodiments of the present invention, it is possible to eliminate a data mismatch that may occur in half-duplex D2D communication.

Furthermore, according to the embodiments of the present invention, it is possible to determine whether to retransmit data using the minimum amount of radio resources.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention and are incorporated in and constitute a part of this application, illustrate embodiments of the invention and together with the description serve to explain the principle of the invention. In the drawings.

BEST MODE FOR INVENTION

Figure 1:
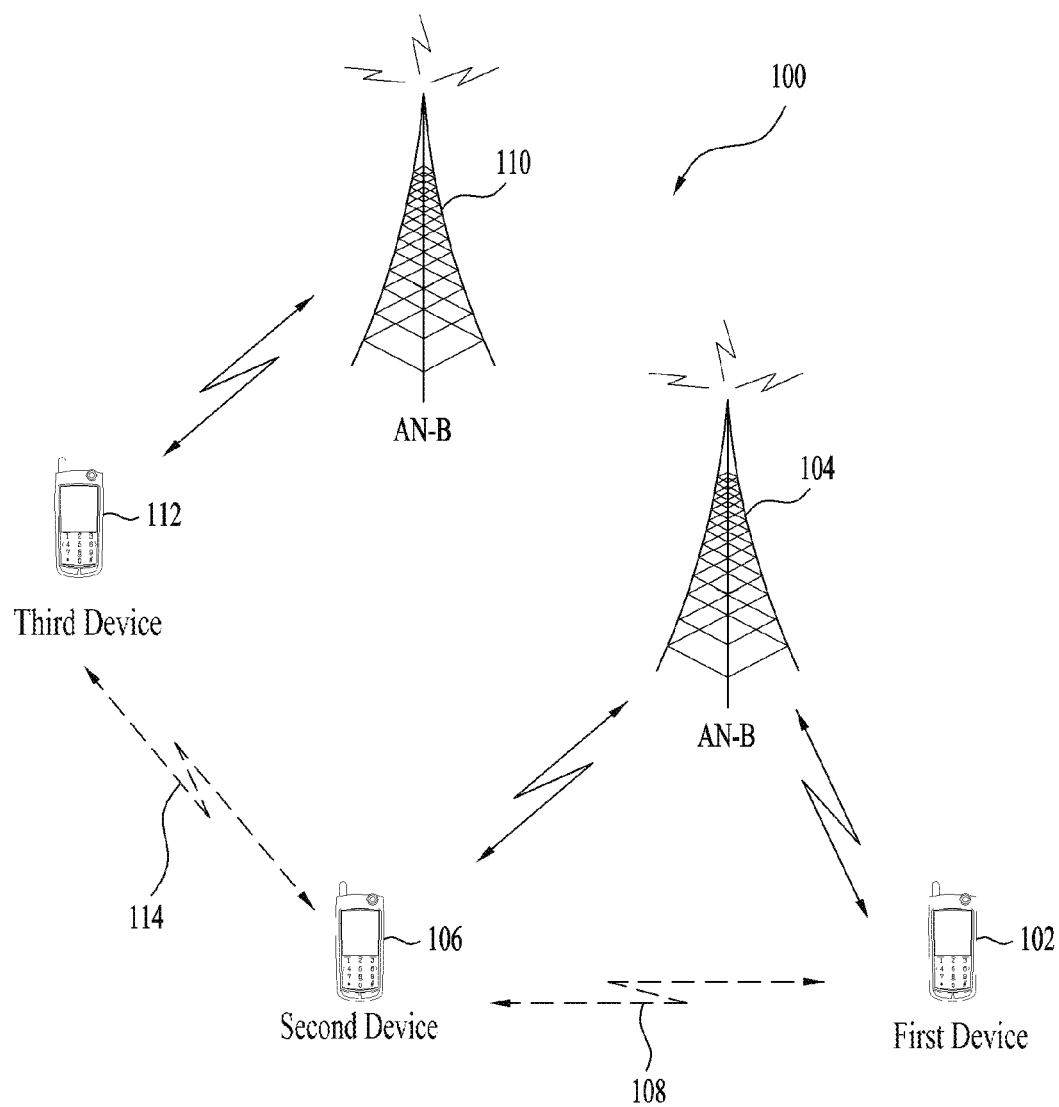
FIG. 1 is a diagram illustrating an example of a D2D network of a wireless communication system.

The following embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment.

In this specification, the embodiments of the present invention have been described based on the data transmission and reception between a base station BS and a user equipment UE. In this case, the base station BS means a terminal node of a network, which performs direct communication with the user equipment UE. A specific operation which has been described as being performed by the base station may be performed by an upper node of the base station BS as the case may be.

In other words, it will be apparent that various operations performed for communication with the user equipment UE in the network which includes a plurality of network nodes along with the base station may be performed by the base station BS or network nodes other than the base station BS. At this time, the base station BS may be replaced with terms such as a fixed station, Node B, eNode B (eNB), and an access point (AP). A relay node may be replaced with terms such as a relay node (RN) and a relay station (RS). Also, a terminal may be replaced with terms such as a user equipment (UE), a mobile station (MS), a mobile subscriber station (MSS), and a subscriber station (SS).

Specific terminologies hereinafter used in the embodiments of the present invention are provided to assist understanding of the present invention, and various modifications may be made in the specific terminologies within the range that they do not depart from technical spirits of the present invention.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present invention may be supported by standard documents disclosed in at least one of wireless access systems, i.e., IEEE 802 system, 3GPP system, 3GPP LTE system, 3GPP LTE, 3GPP LTE-A (LTE-Advanced) system, and 3GPP2 system. Namely, among the embodiments of the present invention, apparent steps or parts, which are not described to clarify technical spirits of the present invention, may be supported by the above documents. Also, all terminologies disclosed herein may be described by the above standard documents.

The following technology may be used for various wireless access systems such as CDMA (code division multiple access), FDMA (frequency division multiple access), TDMA (time division multiple access), OFDMA (orthogonal frequency division multiple access), and SC-FDMA (single carrier frequency division multiple access). The CDMA may be implemented by the radio technology such as universal terrestrial radio access (UTRA) or CDMA2000. The TDMA may be implemented by the radio technology such as global system for mobile communications (GSM)/general packet radio service (GPRS)/enhanced data rates for GSM evolution (EDGE). The OFDMA may be implemented by the radio technology such as IEEE 802.11 (Wi-Fi), IEEE 802.16 (WiMAX), IEEE 802.20, and evolved UTRA (E-UTRA). The UTRA is a part of a universal mobile telecommunications system (UMTS). A 3rd generation partnership project long term evolution (3GPP LTE) communication system is a part of an evolved UMTS (E-UMTS) that uses E-UTRA, and uses OFDMA in a downlink while uses SC-FDMA in an uplink. LTE-advanced (LTE-A) is an evolved version of the 3GPP LTE system. WiMAX may be described by the IEEE 802.16e standard (WirelessMAN-OFDMA Reference System) and the advanced IEEE 802.16m standard (WirelessMAN-OFDMA Advanced system). Although the following description will be based on the 3GPP LTE system and the 3GPP LTE-A system to clarify description, it is to be understood that technical spirits of the present invention are not limited to the 3GPP LTE and the 3GPP LTE-A system.

Specific terms used for the embodiments of the present invention are provided to help the understanding of the present invention. These specific terms may be replaced with other terms within the scope and spirit of the present invention.

FIG. 1 is a diagram illustrating an example of a D2D network of a wireless communication system.

A communication system 100 may include at least one of wireless devices (e.g., a first device 102, a second device 106, and a third device 112). In FIG. 1, although it is shown that the communication system 100 includes only three wireless devices, the communication system 100 may include more or less than three wireless devices.

In the embodiments of the present invention, the wireless devices mean D2D device used in a D2D system/D2D communication. In FIG. 1, each of the first device 102, the second device 106, and the third device 112 may correspond to any one of cellular phones, smart phones, laptop computers, compact communication devices, compact calculation devices, satellite radios, global positioning systems, PDAs, smart meters and/or any other arbitrary devices adequate for performing communication through the wireless communication system 100.

The D2D communication system 100 may support a wide area network (WAN). The WAN may include one or more wireless devices (e.g., the first device (102), the second device (106), and the third device (112)), an arbitrary number of heterogeneous access nodes (not shown in the drawing) receiving, transmitting, and repeating radio communication signals to/from one another, and one or more access nodes (AN) such as AN-A 104 and AN-B 110 within one or more sectors/cells/areas. In the present invention, the AN may be referred to as a base station (BS) or an access point (AP).

Each of the access nodes, the AN-A 104 and AN-B 110 may include multiple transmitter chains and receiver chains, and each of the multiple transmitter chains and receiver chains may include multiple components related to the transmission and reception of radio signals (e.g., processors, modulators, multiplexers, demodulators, de-multiplexers, antennae, and the like). When performing communication through a wide area infra-structure network, which is supported by the communication system 100, the wireless devices may receive signals from the AN or transmit radio signals to the AN. For example, when the first device 102 and second device 106 perform communication with the network through the AN-A 104, the third device 112 may perform communication with the network through the AN-B 110.

Moreover, the wireless devices may also directly perform communication with each other through a D2D network (e.g., Ad-hoc network) in a local area without any controller such as the AN. That is, the wireless devices may directly transceiving signals therebetween to perform the D2D communication. Thus, such signals are not required to be traversed through the access node (e.g., base station) or a centrally managed (or controlled) network. The D2D network may provide short-range fast data rate communication (e.g., type settings such as home, office, and the like). For example, the first device 102 and the second device 106 may configure a first D2D network 108, and the second device 106 and the third device 112 may configure a second D2D network 114. In this case, the D2D network may be used to have the same meaning as a D2D link or a D2D connection.

The link of each of the D2D networks 108 and 114 may be established between wireless devices within a similar geographical area (e.g., within an area of each of the D2D networks). However, the wireless devices are not required to be related to the same sector and/or cell included in a common D2D network. In this case, the D2D networks may overlap with each other. Alternatively, the D2D networks may configure a single D2D network within an area, which is included in another large D2D network.

In addition, the D2D communication between the wireless devices may be synchronized. For example, the first device and the second device may use common clock reference to establish synchronization therebetween. That is, the first device 102 and the second device 106 may obtain timing signals from the AN-A 104. Alternatively, the first device 102 and the second device 106 may also obtain timing signals from other sources (e.g., GPS satellites or television broadcasting stations).

LTE/LTE-A Resource Structure/Channel

Figure 2:
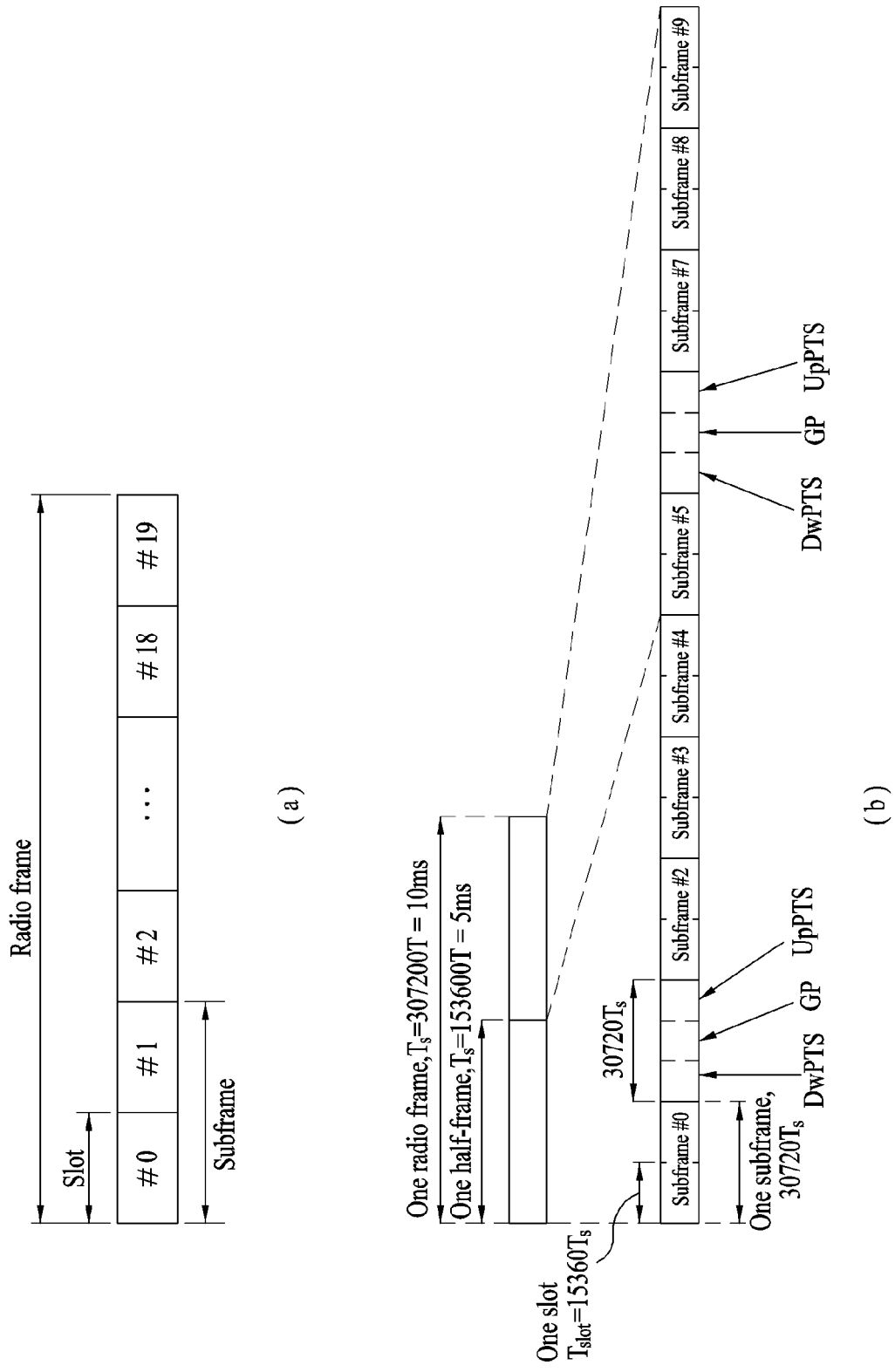
FIG. 2 exemplarily shows a radio frame structure.

A radio frame structure will now be described with reference to FIG. 2.

In a cellular OFDM wireless packet communication system, an uplink/downlink data packet is transmitted on a subframe basis and one subframe is defined as a predetermined time interval including a plurality of OFDM symbols. 3GPP LTE standard supports a type-1 radio frame structure applicable to frequency division duplex (FDD) and a type-2 radio frame structure applicable to time division duplex (TDD).

FIG. 2(a) illustrates the type-1 radio frame structure. A downlink radio frame is divided into 10 subframes. Each subframe is further divided into two slots in the time domain. A unit time during which one subframe is transmitted is defined as transmission time interval (TTI). For example, one subframe may be 1 ms in duration and one slot may be 0.5 ms in duration. A slot may include a plurality of orthogonal frequency division multiplexing (OFDM) symbols in the time domain and includes a plurality of resource blocks (RBs) in the frequency domain. Because the 3GPP LTE system adopts OFDMA for downlink, an OFDM symbol represents one symbol period. An OFDM symbol may be referred to as an SC-FDMA symbol or symbol period. A Resource Block (RB) is a resource allocation unit including a plurality of contiguous subcarriers in a slot.

FIG. 2(b) illustrates the type-2 radio frame structure. The type-2 radio frame includes two half frames each having 5 subframes, a downlink pilot time slot (DwPTS), a guard period (GP), and an uplink pilot time slot (UpPTS). Each subframe includes two slots. The DwPTS is used for initial cell search, synchronization, or channel estimation in a UE, whereas the UpPTS is used for channel estimation in an eNB and uplink transmission synchronization in a UE. The GP is a period between a downlink and an uplink, for eliminating interference with the uplink caused by multi-path delay of a downlink signal. A subframe is composed of two slots irrespective of radio frame type.

The above-described radio frame structures are purely exemplary and thus it is to be noted that the number of subframes in a radio frame, the number of slots in a subframe, or the number of symbols in a slot may vary.

Figure 3:
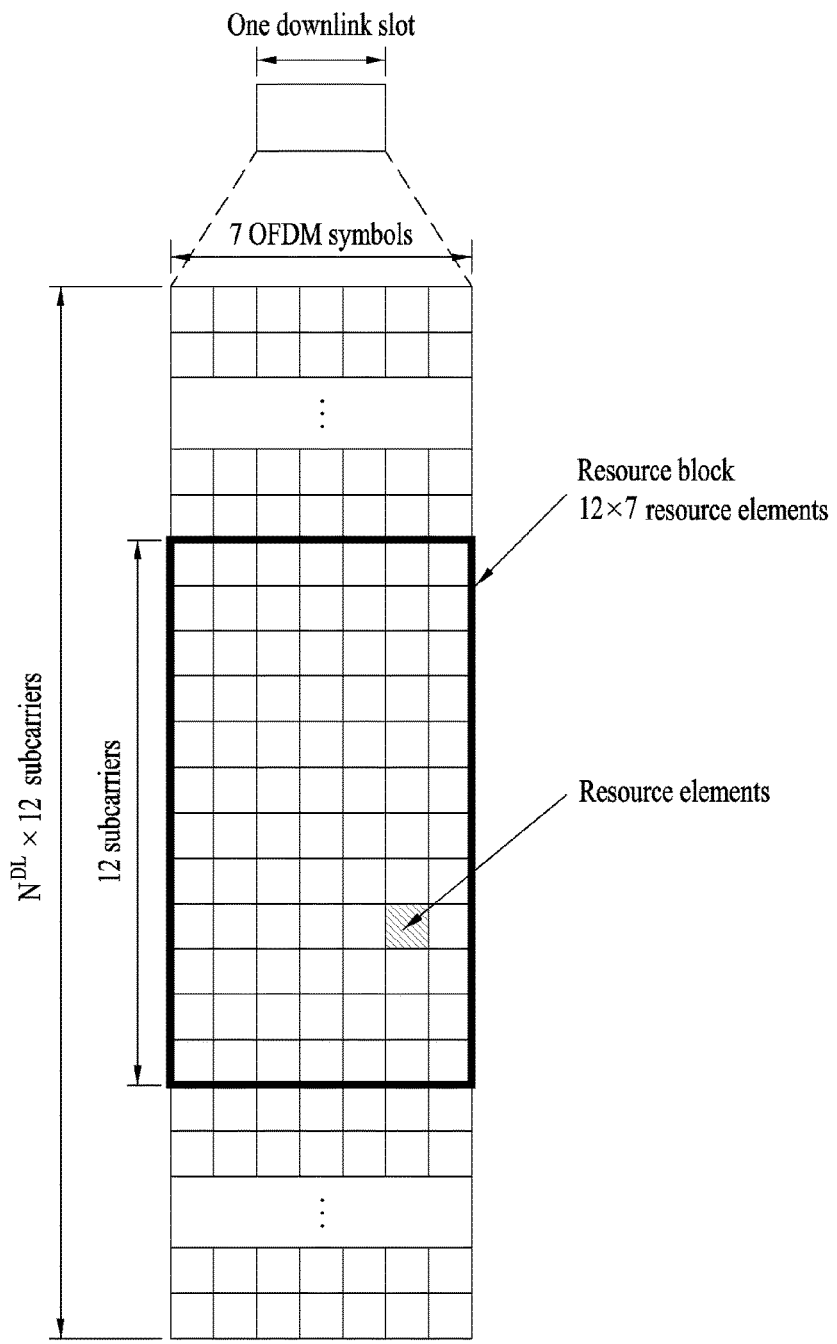
FIG. 3 exemplarily shows a resource grid of one downlink slot.

FIG. 3 illustrates a resource grid for a downlink slot. A downlink slot includes 7 OFDM symbols in the time domain and an RB includes 12 subcarriers in the frequency domain, which does not limit the scope and spirit of the present invention. For example, a slot includes 7 OFDM symbols in the case of normal CP, whereas a slot includes 6 OFDM symbols in the case of extended CP. Each element of the resource grid is referred to as a resource element (RE). An RB includes 12×7 REs. The number of RBs in a downlink slot, NDL depends on a downlink transmission bandwidth. An uplink slot may have the same structure as a downlink slot.

Figure 4:
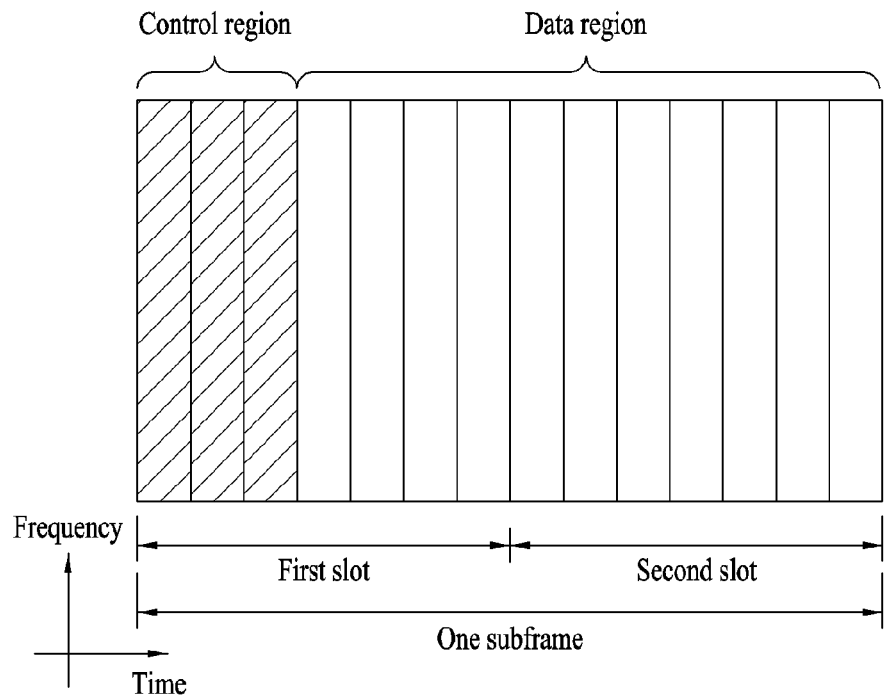
FIG. 4 exemplarily shows a downlink (DL) subframe structure.

FIG. 4 illustrates a downlink subframe structure. Up to three OFDM symbols at the start of the first slot in a downlink subframe are used for a control region to which control channels are allocated and the other OFDM symbols of the downlink subframe are used for a data region to which a PDSCH is allocated. Downlink control channels used in 3GPP LTE include a physical control format indicator channel (PCFICH), a physical downlink control channel (PDCCH), and a physical hybrid automatic repeat request (ARQ) indicator channel (PHICH). The PCFICH is located in the first OFDM symbol of a subframe, carrying information about the number of OFDM symbols used for transmission of control channels in the subframe. The PHICH delivers a HARQ acknowledgment/negative acknowledgment (ACK/NACK) signal in response to an uplink transmission. Control information carried on the PDCCH is called downlink control information (DCI). The DCI includes uplink resource allocation information, downlink resource allocation information or an uplink transmit (Tx) power control command for an arbitrary UE group. The PDCCH delivers information about resource allocation and a transport format for a Downlink Shared Channel (DL-SCH), resource allocation information about an Uplink Shared Channel (UL-SCH), paging information of a Paging Channel (PCH), system information on the DL-SCH, information about resource allocation for a higher-layer control message such as a Random Access Response transmitted on the PDSCH, a set of transmission power control commands for individual UEs of a UE group, transmission power control information, Voice Over Internet Protocol (VoIP) activation information, etc. A plurality of PDCCHs may be transmitted in the control region. A UE may monitor a plurality of PDCCHs. A PDCCH is formed by aggregation of one or more consecutive Control Channel Elements (CCEs). A CCE is a logical allocation unit used to provide a PDCCH at a coding rate based on the state of a radio channel. A CCE corresponds to a plurality of REs. The format of a PDCCH and the number of available bits for the PDCCH are determined according to the correlation between the number of CCEs and a coding rate provided by the CCEs. An eNB determines the PDCCH format according to DCI transmitted to a UE and adds a Cyclic Redundancy Check (CRC) to control information. The CRC is masked by an Identifier (ID) known as a Radio Network Temporary Identifier (RNTI) according to the owner or usage of the PDCCH. If the PDCCH is directed to a specific UE, its CRC may be masked by a cell-RNTI (C-RNTI) of the UE. If the PDCCH carries a paging message, the CRC of the PDCCH may be masked by a Paging Indicator Identifier (P-RNTI). If the PDCCH carries system information, particularly, a System Information Block (SIB), its CRC may be masked by a system information ID and a System Information RNTI (SI-RNTI). To indicate that the PDCCH carries a Random Access Response in response to a Random Access Preamble transmitted by a UE, its CRC may be masked by a Random Access-RNTI (RA-RNTI).

Figure 5:
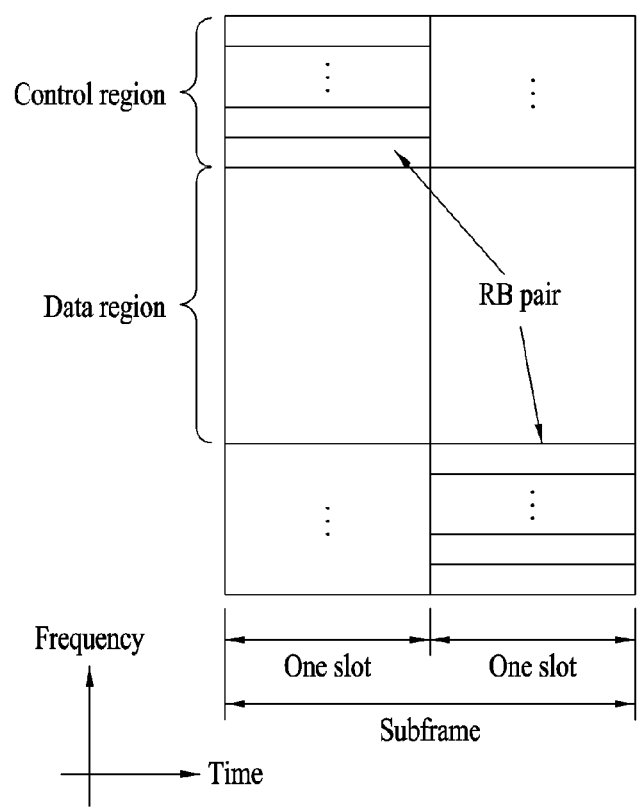
FIG. 5 exemplarily shows an uplink (UL) subframe structure.

FIG. 5 illustrates an uplink subframe structure. An uplink subframe may be divided into a control region and a data region in the frequency domain. A physical uplink control channel (PUCCH) carrying uplink control information is allocated to the control region and a physical uplink shared channel (PUSCH) carrying user data is allocated to the data region. To maintain single carrier property, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

Various embodiments related to D2D communication (also called D2D direct communication) will hereinafter be given. Although D2D communication will hereinafter be described based on 3GPP LTE/LTE-A, it should be noted that D2D communication may also be applied to other communication systems (IEEE 802.16, WiMAX etc.).

D2D Communication Type

D2D communication may be classified into Network coordinated D2D communication and Autonomous D2D communication according to whether D2D communication is executed under network control. The network coordinated D2D communication may be classified into a first type (Data only in D2D) in which D2D communication is used to transmit only data and a second type (Connection Control only in Network) in which the network performs only access control according to the degree of network intervention. For convenience of description, the first type will hereinafter be referred to as a Network Centralized D2D communication type, and the second type will hereinafter be referred to as a distributed D2D communication type.

In the Network Centralized D2D communication type, only data is exchanged between D2D UEs, and connection control between D2D UEs and radio resource allocation (grant message) may be carried out by the network. D2D UEs may transmit and receive data and specific control information using radio resources allocated by the network. For example, HARQ ACK/NACK feedback for data reception between D2D UEs, or Channel State Information (CSI) may not be directly exchanged between the D2D UEs, and may be transmitted to another D2D UE over the network. In more detail, if the network configures a D2D link between D2D UEs and allocates radio resources to the configured D2D link, a transmission D2D UE and a reception D2D UE may perform D2D communication using radio resources. In other words, in the network centralized D2D communication type, D2D communication between D2D UEs may be controlled by the network, and D2D UEs may perform D2D communication using radio resources allocated by the network.

The network in the distributed D2D communication type may perform a more limited role than a network in the network centralized D2D communication type. Although the network of the distributed D2D communication type performs access control between D2D UEs, radio resource allocation (grant message) between the D2D UEs may be autonomously occupied by competition of the D2D UEs without the help of the network. For example, HARQ ACK/NACK or CSI in association with data reception between D2D UEs may be directly exchanged between the D2D UEs without passing through the network.

As illustrated in the above example, D2D communication may be classified into network centralized D2D communication and distributed D2D communication according to the degree of D2D communication intervention of the network. In this case, the network centralized D2D communication type and the distributed D2D communication type are characterized in that D2D access control is performed by the network.

In more detail, the network for use in the network coordinated D2D communication type may configure a D2D link between the D2D UEs scheduled to perform D2D communication, such that connection between the D2D UEs may be constructed. When configuring a D2D link between the D2D UEs, the network may assign a physical D2D link identifier (LID) to the configured D2D link. When plural D2D links are present between the D2D UEs, the physical D2D link ID may be used as an ID for identifying each D2D link.

Unlike the network centralized and distributed D2D communication types, the autonomous D2D communication type may allow the D2D UEs to perform D2D communication freely without the help of the network. That is, unlike the network centralized and distributed D2D communication types, the autonomous D2D communication type may control the D2D UE to autonomously perform access control and radio resource occupancy. If necessary, the network may also provide the D2D UE with D2D channel information capable of being used in the corresponding cell.

D2D Communication Link Configuration

For convenience of description, a UE, which is scheduled to perform or can perform D2D communication including D2D direct communication, will hereinafter be referred to as a D2D UE. If a transmitter and a receiver need to be distinguished from each other, a D2D UE, which is scheduled to transmit or can transmit data to another D2D UE using radio resources allocated to the D2D link during D2D communication, will hereinafter be referred to as a transmission (Tx) D2D UE, or another UE, which is scheduled to receive or can receive data from the Tx D2D UE, will hereinafter be referred to as a reception (Rx) D2D UE. If a plurality of D2D UEs, which is scheduled to receive or can receive data from the Tx D2D UE, is used, the Rx D2D UEs may also be identified by ordinal numerals such as "$1^{st}$ to $N^{th}$". For convenience of description, either a base station (BS) for controlling access between the D2D UEs or allocating radio resources to the D2D link or a node (such as a D2D server, and an access/session management server) located at a network stage will hereinafter be referred to as a network.

D2D UE scheduled to perform D2D communication needs to pre-recognize the presence or absence of neighbor D2D UEs capable of transmitting and receiving data so as to transmit data to another D2D UE through D2D communication. For this purpose, the D2D UE may perform D2D peer discovery. The D2D UE may perform D2D discovery within a discovery interval, and all D2D UEs may share the discovery interval. The D2D UE may monitor logical channels of a discovery region within the discovery interval, and may thus receive D2D discovery signals from other D2D UEs. D2D UEs having received a transmission (Tx) signal from another D2D UE may construct the list of neighbor D2D UEs using a reception (Rx) signal. In addition, D2D UE may broadcast its own information (i.e., ID) within the discovery interval, and other D2D UEs may receive the broadcast D2D discovery signal, such that the presence of the corresponding D2D UE in a D2D communication available range may be recognized.

Information for the D2D discovery may be broadcasted periodically. In addition, a timing of such a broadcast may be determined by a protocol in advance and then informed D2D UEs. The D2D UE may transmit/broadcast a signal during a part of the discovery interval and each D2D UE may monitor signals potentially transmitted by other D2D UEs during the rest of the D2D discovery interval.

For instance, the D2D discovery signal may be a beacon signal. In addition, D2D discovery intervals may include a multitude of symbols (e.g., OFDM symbols). The D2D UE may transmit/broadcast the D2D discovery signal in a manner of selecting at least one symbol in the D2D discovery interval. Moreover, the D2D may transmit a signal corresponding to one tone existing in the symbol selected by the D2D UE.

After the D2D UEs discover each other through the D2D discovery process, the D2D UEs may establish a connection establishment process. For instance, the first wireless device 102 and the second wireless device 106 may be linked to each other through the connection process. Thereafter, the first wireless device 102 may transmit traffic to the second wireless device 106 using the D2D link 108. The second wireless device 106 may also transmit traffic to the first wireless device 102 using the D2D link 108.

Figure 6:
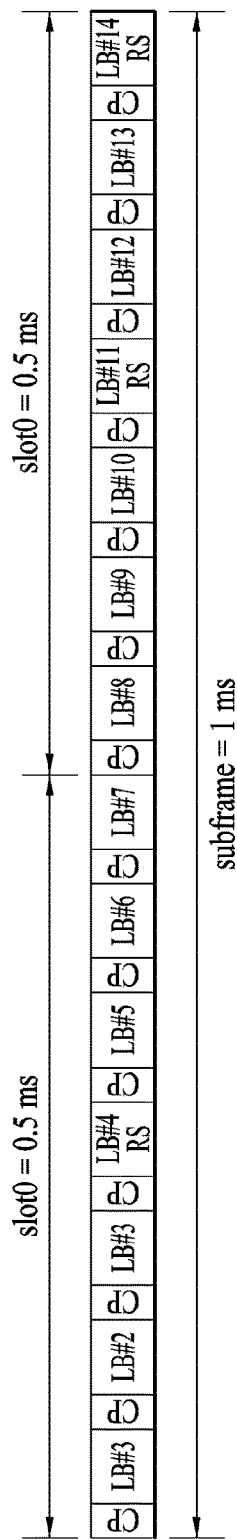
FIG. 6 schematically shows a D2D communication network.

FIG. 6 schematically shows a D2D communication network.

In FIG. 6, D2D communication is performed between UEs (UE1 and UE2) supporting the D2D communication. In general, a UE (user equipment) means a user terminal. However, when a network equipment such as an eNB (evolved Node B) transceives signals according to a communication scheme between UEs (UE1 and UE2), the eNB may also be regarded as a kind of the UE.

The UE1 may be configured to select a resource unit corresponding to specific resources in a resource pool indicating a set of resources and transmit a D2D signal using the corresponding resource unit. The UE2 corresponding to a receiving UE may receive a configuration of the resource pool used by the UE1 to transmit the signal and detect the signal of the UE1 in the corresponding resource pool. For example, when the UE1 is within a coverage of a BS, the BS may inform the resource pool. On the other hand, for example, when the UE1 is out of the coverage of the BS, another UE may inform the UE1 of the resource pool or the UE1 may determine the resource pool based on predetermined resources. Generally, the resource pool may include a plurality of resource units and each UE may select one or a plurality of resource units to transmit its D2D signal.

Figure 7:
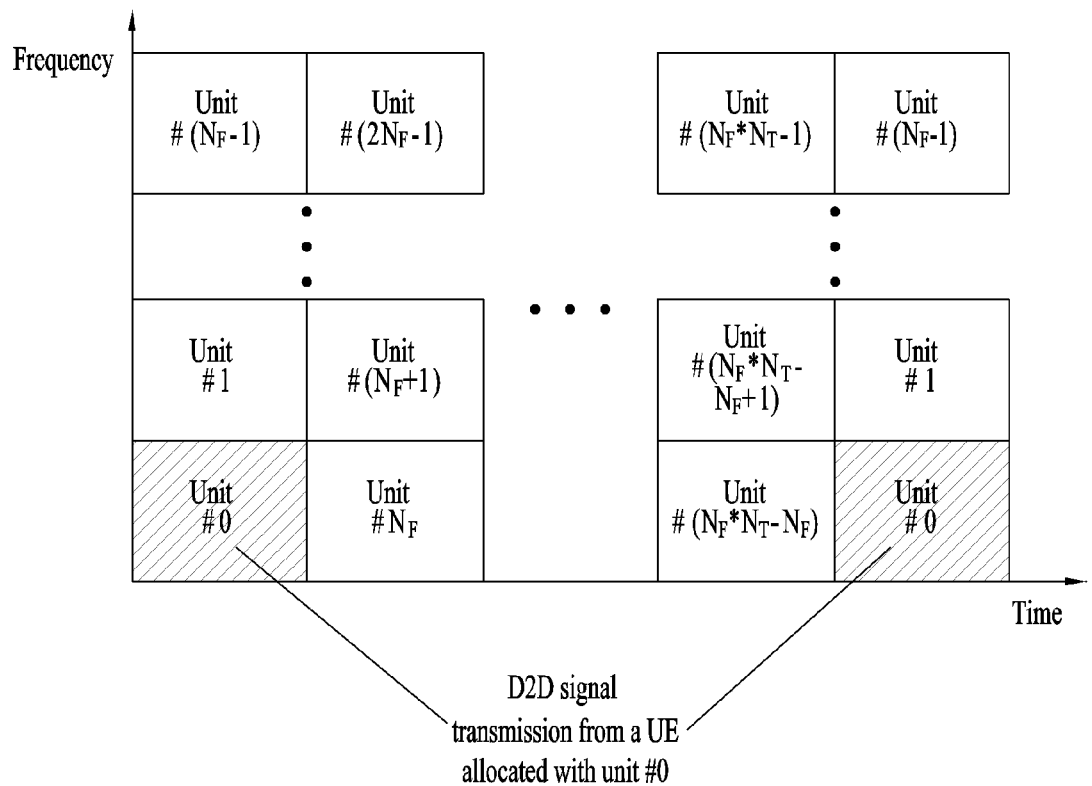
FIG. 7 shows an example of a configuration of a resource unit.

FIG. 7 shows an example of a configuration of a resource unit.

In FIG. 7, a vertical axis means frequency resources and a horizontal axis means time resources. In addition, radio resources are divided into $N_T$ resources in the time axis, thereby configuring $N_T$ subframes. In addition, frequency resources are divided into $N_F$ resources in a single subframe, whereby the single subframe may include $N_T$ symbols. Thus, a total of ($N_F*N_T$) resource units may constitute a resource pool.

In an embodiment of FIG. 7, since a D2D transmission resource allocated to unit #0 is repeated every $N_T$ subframes, the resource pool may be repeated with a period of $N_T$ subframes. As shown in FIG. 7, a specific resource unit may be repeated periodically. In addition, to obtain a diversity effect in a time dimension or a frequency dimension, an index of a physical resource unit to which a single logical resource unit is mapped may be changed according to a predetermined pattern. For instance, the logical resource unit may be hopped on the time and/or frequency axes according to the pattern predetermined on the actual physical resource unit. In FIG. 7, the resource pool may mean a set of resource units that can be used by a UE intending to transmit a D2D signal to transmit the D2D signal.

The aforementioned resource pool can be subdivided into several types. For instance, the resource pool may be classified according to a content of the D2D signal transmitted in each resource pool. For example, the content of the D2D signal can be classified as follows and a separate resource pool may be configured for each content.

Scheduling assignment (SA): The SA (or SA information) may include a location of resources used by each transmitting UE for transmitting a following D2D data channel, MCS (modulation and coding scheme) necessary for demodulation of other data channels, and/or a MIMO (multiple input multiple output) transmission scheme. In addition, the SA information may include an identifier of a target user equipment to which the transmitting UE intends to transmit data. A signal containing the SA information may be multiplexed and transmitted with D2D data on the same resource unit. In this case, an SA resource pool may mean a resource pool in which the SA is multiplexed and transmitted with the D2D data.
  D2D data channel: The D2D data channel may mean a resource pool used by the transmitting UE for transmitting user data by utilizing the resources designated through the SA. In case that the D2D data channel is multiplexed and transmitted with D2D resource data on the same resource unit, only the D2D data channel except the SA information may be transmitted in the resource pool for the D2D data channel. In other words, resource elements for transmitting the SA information on each individual resource unit in the SA resource pool may be used for transmitting the D2D data in the resource pool for the D2D data channel.
  Discovery message: A discovery message resource pool may mean a resource pool for transmitting the discovery message. The transmitting UE may transmit the discovery message containing information such as its ID (identifier) for the purpose of enabling neighboring UEs to discover the corresponding transmitting UE.

As described above, the D2D resource pool may be classified according to the content of the D2D signal. However, although D2D signals have the same content, different resource pools may be used according to transmitting and receiving properties of the D2D signals. For instance, even in the case of the same D2D data channel or discovery message, different resource pools may be used according to a scheme for determining a transmission timing of the D2D signal (e.g., the D2D signal is transmitted at a reception time of a synchronization reference signal or at a time obtained by applying a timing advance to the reception time), a scheme for assigning a resource (e.g., an eNB designates a resource for transmitting each individual signal for each individual transmitting UE or each individual transmitting UE autonomously selects the resource for transmitting each individual signal from its resource pool), or a signal format (e.g., the number of symbols occupied by each D2D signal in a single subframe or the number of subframes used for transmitting a single D2D signal).

As mentioned in the foregoing description, a UE that intends to transmit data using the D2D communication may transmit its SA information by selecting appropriate resources from the SA resource pool. In addition, for instance, as reference for selecting the SA resource pool, resources not used by a different UE for SA information transmission and/or SA resources interconnected with resources in a subframe where data transmission is not expected after the SA information transmission by the different UE may be selected as the SA resource pool. Moreover, the UE may select SA resources interconnected with data resources where a low level of interference is expected. Furthermore, the SA information may be broadcasted. Thus, UEs in the D2D communication system may receive the broadcasted SA information. Hereinafter, the term "transmission" or "transfer" may be replaced with the term "broadcasting".

Figure 8:
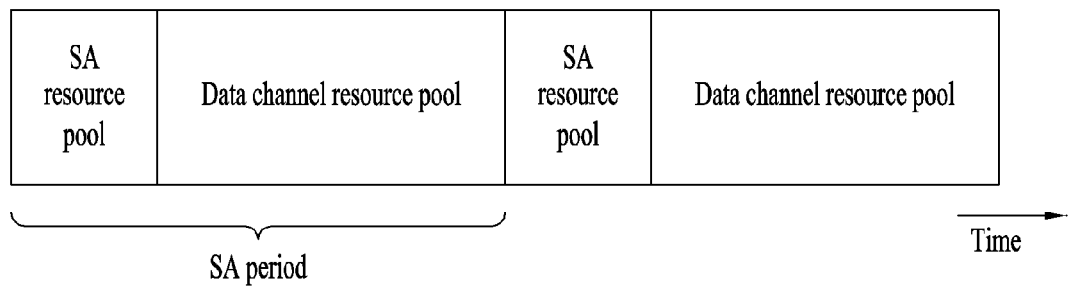
FIG. 8 shows an example of a periodic SA resource pool.

FIG. 8 shows an example of a periodic SA resource pool.

For instance, an SA resource pool may be ahead of a D2D data channel resource pool. First, a UE attempts to detect SA information. If the UE discovers data that the corresponding UE needs to receive, the UE may attempt to receive the data on data resources interconnected with the UE. For example, a resource pool may be composed of the preceding SA resource pool and the following data channel resource pool as shown in FIG. 8. In addition, the SA resource pool may appear periodically as shown in FIG. 8. In the following description, the period in which the SA resource pool appears may be referred to as an SA period.

To efficiently utilize resources, the SA resource pool may be configured with a short time (i.e., a small number of subframes). For instance, the SA resource pool may be configured with four subframes in the time domain. However, this configuration is merely exemplary, the SA resource pool may be configured with more or less than the four subframes. For instance, when the SA resource pool is configured with the four subframes, a UE may be required to simultaneously perform transmission and reception in a single time unit (e.g., a subframe) due to lack of resources. In particular, when a UE based on a half-duplex communication scheme is required to simultaneously perform transmission and reception in a single resource element (e.g., one symbol of a subframe), the UE may not be able to receive data, which is transmitted to the corresponding UE.

Figure 9:
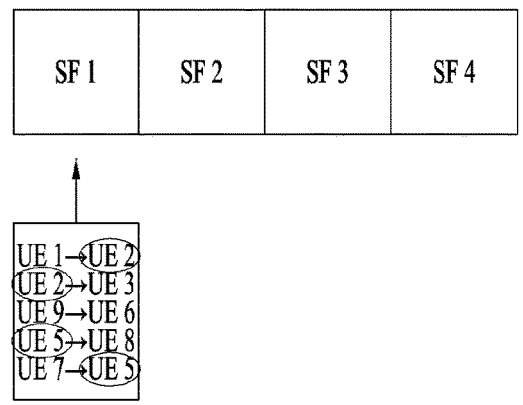
FIG. 9 is a diagram for explaining a half-duplex problem.

FIG. 9 is a diagram for explaining a half-duplex problem.

For convenience of description, it is assumed in FIG. 9 that a resource pool for the D2D communication is composed of four subframes (SFs) in the time domain. In addition, for the same purpose, it is assumed that the resource pool includes a single symbol in the frequency domain. UE1 transmits its SA information to UE2 in SF1 in order to transmit data. However, the UE2 transmits its SA information to UE3 in the same subframe, SF1. Thus, if the UE2 corresponds to a half-duplex communication based UE, the UE2 cannot be aware of the fact that the UE1 transmits the data to the UE2. That is, the UE2 has a half-duplex problem. Moreover, in FIG. 9, UE5 may have the same problem as the UE2. Due to such a half-duplex problem, a UE cannot receive data transmitted from another UE. Accordingly, a method of ensuring data transmission and reception in D2D communication is required.

To solve the above-described half-duplex problem, a receiving UE can be configured to retransmit SA information of a transmitting UE.

For instance, after receiving SA information of transmitting UEs, receiving UEs may retransmit the SA information of the transmitting UEs on predesignated resources in the SA resource pool. For example, all receiving UEs (e.g., all UEs except the transmitting UEs) may retransmit the received SA information using the predesignated resources.

Figure 10:
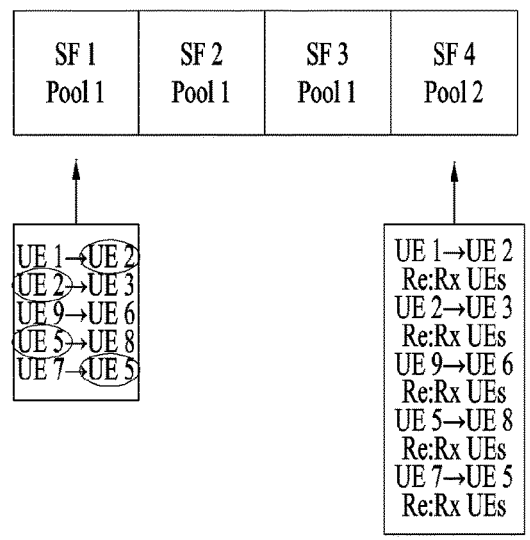
FIG. 10 shows SA information retransmission by receiving user equipments.

In FIG. 10, an SA resource pool is composed of four subframes (SF1, SF2, SF3, and SF4). The resource pool in FIG. 10 is merely exemplary and a resource pool can be composed of a random number of subframes. In FIG. 10, the SA resource pool is divided into pool 1 (SF1, SF2, and SF3) and pool 2 (SF4). In addition, in the SA resource pool, the first and second subframes (i.e., SF1 and SF2) may be designated as the pool 1 and the third and fourth subframes (i.e., SF3 and SF4) may be designated as the pool 2. Moreover, two subframes may constitute the SA resource pool. In this case, the first subframe may be designated as the pool 1 and the second subframe may be designated as the pool 2. The pool 1 of the SA resource pool may be used by transmitting UEs for transmitting SA information and the pool 2 may be used by receiving UEs for retransmitting the SA information. Furthermore, resources in the pool 1 and pool 2 may be configured to be mapped in advance. For instance, the receiving UE may retransmit the SA information at a location of a resource in the pool 2 corresponding to a location of the resource in the pool 1 in which the SA information is received.

Referring to FIG. 10, in a first subframe (SF1), UE1, UE2, UE9, UE5, and UE7 transmit SA information for data transmission to UE2, UE3, UE6, UE8 and UE5, respectively. In this case, although the UE2 and the UE5 transmit the SA information for the data transmission, the UE2 and the UE5 are simultaneously required to receive the SA information from the UE1 and the UE7, respectively. Thus, the UE2 and the UE5 may not be able to receive the SA information for the UE2 and the UE5. In this case, receiving UEs (i.e., UEs that do not transmit the SA information in pool 1 of FIG. 10) may transmit the received SA information in pool 2 (corresponding to SF4) in order to enable the UE2 and the UE5 to receive the SA information. Although FIG. 10 shows the SA information is transmitted in the SF1, the receiving UEs may receive the SA information in the rest of the pool 1 (i.e., SF2 and SF3) and transmit all of the received SA information in the pool 2.

Moreover, time and frequency locations of a resource unit containing the SA information may be configured to indicate a location of a resource for transmitting D2D data. In this case, UEs for retransmitting the SA information of the pool 1 (i.e., receiving UEs in the SF1) may be configured to retransmit the SA information using a resource unit in the pool 2 having the same location as a frequency location of the SA information received in the pool 1. In addition, a time location of the SA information in the pool 1 may also be mapped to a time location of a resource unit in the pool 2 in advance. Also, the SA information may be retransmitted at a specific time of the pool 2 based on the above mapping. On the other hand, the receiving UEs may retransmit the SA information by selecting a random location in the SA pool.

Furthermore, to reduce resources for the SA information retransmission and interference, UEs may be grouped in advance. For instance, the UEs may be grouped within a D2D cluster by a prescribed period or at a predetermined time. After a UE in a group receives the SA information transmitted by the transmitting UE, UEs except a transmitting UE in the group may retransmit the SA information of the transmitting UE.

Figure 11:
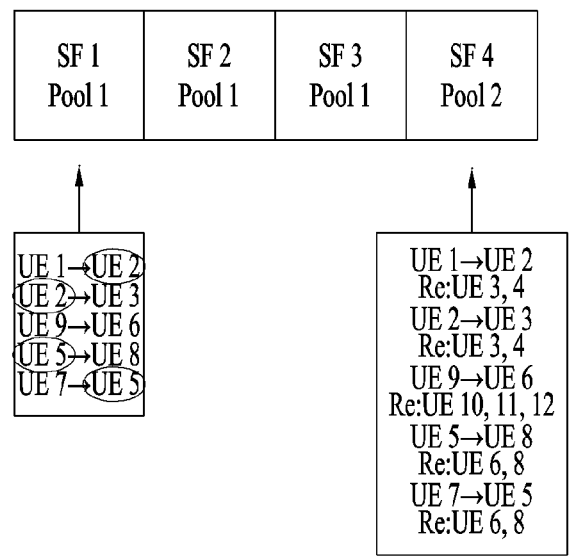
FIG. 11 shows SA information retransmission by user equipments in a group.

In FIG. 11, UE1, UE2, UE3, and UE4 are grouped into a first group, UE5, UE6, UE7 and UE8 are grouped into a second group, and UE9, UE10, UE11 and UE12 are grouped into a third group. In a first subframe (SF1) of pool 1, UE1, UE2, UE9, UE5, and UE7 transmit SA information for data transmission to UE2, UE3, UE6, UE8 and UE5, respectively. In this case, receiving UEs in the same group as a UE that transmits SA information (i.e., UEs in the same group that do not transmit the SA information in the SF1) may retransmit the SA information for the transmitting UE in pool 2. For instance, as shown in FIG. 11, when the UE1 and the UE2 transmit the SA information in the pool 1, receiving UEs in the same group, the UE3 and the UE4 may retransmit the SA information for the UE1 and the UE2 in the pool 2.

In addition, UEs for retransmitting the SA information in the UE group may be configured in advance. For instance, a single transmitting UE in the UE group may match with at least one different UE. Thus, when the transmitting UE transmits the SA information, the UE matching with the transmitting UE may retransmit the SA information after receiving the SA information. For instance, when the UE1, UE2, and UE3 forms the group, the UE1 may match with the UE3. When the UE1 transmits the SA information, the UE3 matching with the UE1 in the group may retransmit the SA information of the UE1.

Moreover, after receiving the SA information of the transmitting UE, the receiving UE may determine a transmitting UE (e.g., a UE having a half-duplex problem) that is required to perform transmission and reception on a single time resource or a single time and/or frequency resource. For instance, a UE that receives the SA information from the UE1 and the SA information to the UE1 on the same time resource may determine that retransmission of the SA information for the UE1 is required.

Furthermore, the UE may determine the retransmission of the SA information based on a modular operation. For instance, when a value obtained by performing an N modular operation on an ID of the UE required to retransmit the SA information is equal to an N modular value of its ID, the UE may retransmit the SA information for the corresponding transmitting UE after receiving the SA information for the corresponding transmitting UE, where N is a random positive integer and it may be determined in advance.

Additionally, the receiving UE may determine the retransmission of the SA information based on a probability for the transmitting UE required to simultaneously perform transmission and reception in a single radio resource. For instance, the receiving UE may perform the SA information retransmission for the UE required to retransmit the SA information according to a predetermined probability. In addition, the probability for the retransmission may be previously configured for each UE. Alternatively, it may be changed depending on a billing state or a communication state of the current UE.

Additionally, the receiving UE may receive the SA information from a plurality of transmitting UEs. Based on the received SA information, the receiving UE may determine that one or more transmitting UEs are required to retransmit the SA information (due to, for example, the half-duplex problem). In this case, the receiving UE may retransmit the SA information for some among the UEs required to retransmit the SA information. In addition, the receiving UE may measure a receive power of an SA information signal received from the transmitting UE. For instance, based on the receive power, the receiving UE may retransmit the SA information only for some transmitting UEs among the UEs required to retransmit the SA information. For example, the receiving UE may retransmit the SA information for the transmitting UEs ranked within the top M receive powers among the UEs required to retransmit the SA information, where M is a natural value greater than 1 and it may be predetermined. Moreover, for example, the receiving UE may retransmit the SA information for the transmitting UEs having receive powers equal to or greater than a predetermined threshold among the UEs required to retransmit the SA information. Furthermore, when the SA information retransmission is determined based on the receive power of the SA information, a weight value may be configured for the receive power of each UE. For instance, a weight value for a receive power of an SA information signal from a UE required to retransmit the SA information may be set based on the number of times of the SA information retransmission by the UE required to retransmit the SA information to the corresponding UE. Alternatively, the weight value may be set to be proportional to the number of times of the SA information retransmission by another UE to the corresponding UE.

Additionally, the UE may be configured to retransmit the SA information maximum k times in a prescribed period. The prescribed period and k may be predetermined. In addition, a power of the UE is equal to or less than a predetermined value, the UE may be configured not to transmit the SA information.

Meanwhile, as described with reference to FIG. 11, UEs may be grouped to reduce the number of times of the SA information retransmission. In addition, a UE for the retransmission may be designated in the group. In the case of designating the UE for the retransmission, the following methods may be considered.

When the number of UEs which need to perform transmission and reception in the same time resources (e.g., UEs having the half-duplex problem, i.e., UEs required to retransmit the SA information) in one group is equal to or greater than n (where n is a natural number equal to or greater than 1), the number n of the UEs are arranged in ascending order according to a UE ID (user equipment identifier) of each UE and remaining UEs in the group are arranged in ascending order according to a UE ID of each UE. Among the remaining UEs, the number n of UEs having higher UE IDs may retransmit the SA information by matching order of their UE IDs with order of the UEs required to retransmit the SA information by one-to-one relationship (1:1). In other words, the UEs required to perform the retransmission and the UE for performing the retransmission may be matched with each other by the one-to-one relationship.

Meanwhile, the remaining UEs in the group may be less than the number n of the UEs required to retransmit the SA information. For instance, the number of the remaining UEs in the group is m (where m is a natural number satisfying n>m). In this case, as described above, the number n of the UEs required to retransmit the SA information and the number m of the remaining UEs are arranged in ascending order according to the UE ID, respectively. The SA information retransmission for the number m of UEs having higher UE IDs among the number n of the UEs required to retransmit the SA information may be performed. Thus, the number m of the remaining UEs may perform the SA information retransmission for the number m of the UEs among the UEs required to retransmit the SA information according to order of the UE ID.

Figure 12:
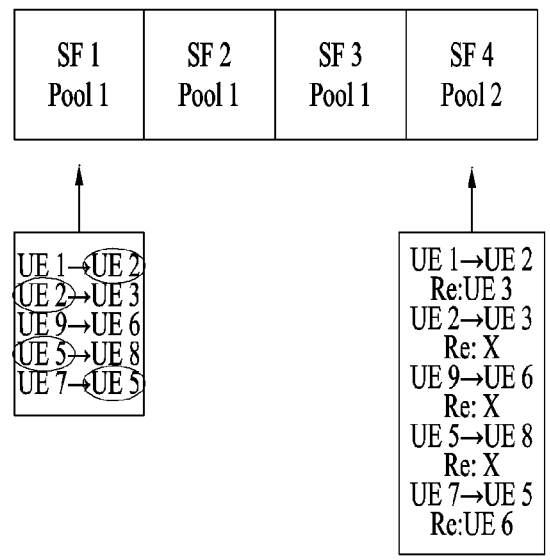
FIG. 12 shows SA information retransmission by user equipments designated in a group.

In FIG. 12, UE1, UE2, UE3, and UE4 are grouped into a first group, UE5, UE6, UE7 and UE8 are grouped into a second group, and UE9, UE10, UE11 and UE12 are grouped into a third group. In a first subframe (SF1) of pool 1, UE1, UE2, UE9, UE5, and UE7 transmit SA information for data transmission to UE2, UE3, UE6, UE8 and UE5, respectively. In this case, although the UE2 and UE5 transmit the SA information for the data transmission, the UE2 and UE5 are simultaneously required to receive the SA information from the UE1 and the UE7, respectively. Thus, the UE2 and UE5 may not be able to receive the SA information for the UE2 and UE5. Therefore, receiving UEs may determine that retransmission of the SA information for the UE2 and UE5 is necessary. That is, the UE2 in the first group is required to retransmit the SA information. In this case, among the remaining UEs which do not transmit the SA information in the first group (i.e., UE3 and UE4), the UE3 has the highest UE ID. Thus, for the UE2, the UE3 may retransmit the SA information (the SA information for transmitting data from the UE1 to the UE2) in pool 2. In addition, the UE5 in the second group is also required to retransmit the SA information. In this case, among the remaining UEs which do not transmit the SA information in the second group (i.e., UE6 and UE8), the UE6 has the highest UE ID. Thus, for the UE5, the UE6 may retransmit the SA information (the SA information for transmitting data from the UE7 to the UE5) in the pool 2. Meanwhile, the remaining SA information except the SA information for the UE2 and UE5 may be received by the UE3, UE6 and UE8. Thus, the remaining SA information except the SA information the UE2 and UE5 is not retransmitted.

Regarding the designation of the UE for the SA information retransmission in the group, it is described above that one UE for retransmitting the SA information is allocated for each UE required to retransmit the SA information. However, one or more UEs may retransmit the SAI information for each UE required to retransmit the SA information. For instance, the SA information may be retransmitted for one UE required to retransmit the SA information. When a plurality of UEs are configured to transmit the SA information for a single UE, the UEs that retransmit the SA information may perform the SA information retransmission according to their power levels.

The UEs for the SA information retransmission may be determined, without the grouping, based on a modular operation, a predetermined probability, and/or a distance between the UE required to retransmit the SA information and the retransmitting UE. For example, a UE located within a predetermined distance from the UE required to retransmit the SA information or a UE closest to the UE required to retransmit the SA information may perform the SA information retransmission for the corresponding UE.

Meanwhile, the receiving UEs may need to read a full D2D frequency band within the pool 1 to retransmit the SA information. To reduce the load of the receiving UE due to reception in the full frequency band, a DMRS (demodulation reference signal) sequence of the SA pool may be generated based on the transmitting UE's ID and the receiving UE's ID. If the receiving UE receives the DMRS sequence reflecting the transmitting UE's ID and the receiving UE's ID, the receiving UE can be aware of the resource unit which the corresponding receiving UE needs to know by reading only a DMRS region in the pool 1, thereby reducing the load of the UE due to the reception in the full frequency band.

As described above, the receiving UEs can be recognize a collision in the SA information (e.g., a UE transmitting the SA information receives the SA information transmitted by the UE) by receiving the SA information. Thus, the UEs in the above-described embodiments may not only perform the SA information retransmission but may also inform the UE with the collision of the presence of the collision.

Referring back to the FIG. 12, when a plurality of pieces of SA information is transmitted in the SF1 using the same resources including even a frequency band, the SA information may collide with one another. Thus, the SA information may be difficult to be read by different UEs. In this case, UEs may inform presence of collisions by transmitting UE IDs of the UEs with the collisions and/or the SA information. The following methods can be considered for the receiving UEs to inform the presence of collisions.

The UEs may be grouped in advance. When the SA information transmitted by the transmitting UE collides with another SA information, other UEs in the group to which the transmitting UE belongs may inform UE IDs of UEs with the SA information where the collision occurs on designated resources in the SA resource pool. The number n of UEs among remaining UEs in the group to which the transmitting UE corresponding to the SA information with the collision belongs may inform the corresponding transmitting UE of the presence of the collision (where n is a predetermined natural number, which is equal to or greater than 1). Meanwhile, a group with the SA information where the collision occurs may be formed to inform transmitting UEs in another group of the presence of the collision. Moreover, the number n of UEs in the formed group may be configured to inform the transmitting UEs in another group of the presence of the collision.

Additionally, a UE may add up UE IDs of the transmitting UEs with the collision and then perform the modular operation on the added-up UE ID using a predetermined numeral. In this case, a UE that recognizes the presence of the collision may be configured to inform the presence of the collision in case that a value obtained by performing the modular operation on the added-up UE ID is equal to a value obtained by performing the modular operation on its UE ID based on the predetermined numeral.

Additionally, after recognizing the collision of the SA information transmitted by the transmitting UEs, the receiving UEs may inform IDs of the transmitting UEs corresponding to the SA information with the collision using predetermined resource in the SA resource pool according to a predetermined probability or in a random manner.

Additionally, after being informed of the collision of the SA information by different UEs, the UE that transmits the SA information (the UE required to retransmit the SA information) may re-announce (transmit or broadcast) the SA information using predetermined resources in the SA resource pool.

The resources for informing the collision of the SA information may be configured in a similar manner to the configuration of the SA resource pool described with reference to FIG. 10.

Figure 13:
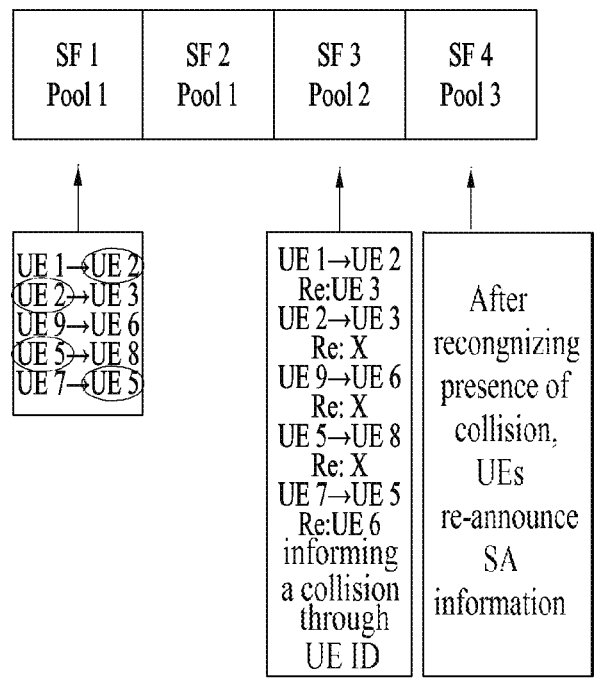
FIG. 13 shows SA information retransmission according to an embodiment.

The above-mentioned embodiments of the present invention may be selectively combined with each other. In FIG. 13, UEs may be grouped, a retransmitting UE in the group may be pre-configured based on a transmitting UE, and the transmitting UE and the retransmitting UE may match with each other in ascending order according to a UE ID. In addition, in FIG. 13, a collision of SA information may be informed a UE where the collision occurs. After recognizing presence of the collision, a UE that transmits the SA information may re-announce the SA information using predetermined resources.

Referring to FIG. 13, UE1, UE2, UE3, and UE4 are grouped into a first group, UE5, UE6, UE7 and UE8 are grouped into a second group, and UE9, UE10, UE11 and UE12 are grouped into a third group. In a first subframe (SF1) of pool 1, UE1, UE2, UE9, UE5, and UE7 transmit SA information for data transmission to UE2, UE3, UE6, UE8 and UE5, respectively. In this case, although the UE2 and UE5 transmit the SA information for the data transmission, the UE2 and UE5 are simultaneously required to receive the SA information from the UE1 and the UE7, respectively.

In FIG. 13, based on an ascending arrangement of UE IDs, the UE3 and UE6 may inform a collision of the SA information through a UE ID using a third subframe (SF3). Thereafter, the UE1 and UE7 may re-announce their SA information using a predetermined resource (e.g., SF4) after recognizing that the collision occurs in their SA information.

Moreover, when a UE discovers a plurality of transmitting UEs that intend to transmit data to the UE using the same resources, the UE may request to another transmitting UE not to transmit other data using resources overlapping with those for data that the UE needs to receive in a designated resource pool. In this case, the transmitting UE that receives the request for not using the overlapping resources may re-announce the SA information by changing a location of the data to be transmitted.

Furthermore, a UE that receives the SA information may transmit ACK (acknowledgement) for the reception of the SA information. In this case, the ACK for the reception of the SA information may be transmitted only in a predetermined data pool. When the UE that transmits the SA information fails to receive the ACK from the receiving UE, the transmitting UE may consider failure in receiving the ACK as NACK (negative-ACK) and then re-announce the SA information in a designated pool.

Figure 14:
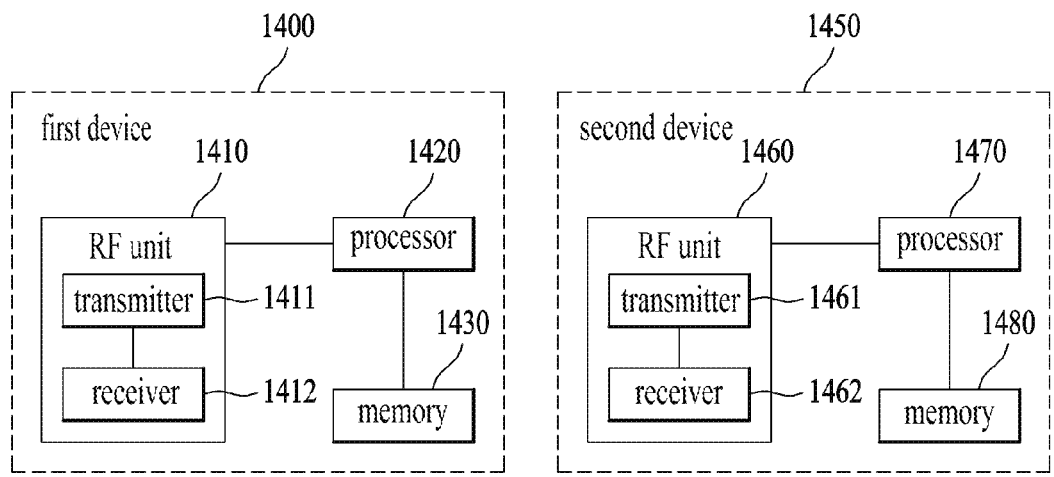
FIG. 14 is a schematic diagram for explaining configurations of devices to which the embodiments of the present invention described with reference to FIGS. 1 to 13 can be applied as an embodiment of the present invention.

FIG. 14 is a schematic diagram for explaining configurations of devices to which the embodiments of the present invention described with reference to FIGS. 1 to 13 can be applied as an embodiment of the present invention.

In FIG. 14, a first device 1400 and a second device 1450 as D2D user equipments may include radio frequency (RF) units 1410 and 1460, processors 1420 and 1470, and optionally memories 1430 and 1480, respectively. Although two D2D devices are shown in FIG. 14, a plurality of D2D devices may establish a D2D communication environment.

The RF units 1430 and 1460 may include transmitters 1411 and 1461 and receivers 1412 and 1462, respectively. The transmitter 1411 and the receiver 1412 of the first device 1400 are configured to transmit and receive signals to and from the second device 1450 and other D2D devices. The processor 1420 is functionally connected to the transmitter 1411 and the receiver 1412 and may be configured to control a process of, at the transmitter 1411 and the receiver 1412, transmitting and receiving signals to and from other devices. Meanwhile, the first device 1400 and/or the second device 1450 may correspond to a base station.

In addition, the processor 1420 performs various processing on a signal to be transmitted and then transmits the signal to the transmitter 1411. Moreover, the processor 1420 may also perform processing on a signal received by the receiver 1412. If necessary, the processor 1420 may store information included in an exchanged message in the memory 1430.

The first device 1400 with the aforementioned structure may perform the methods according to the various embodiments of the present invention described above. For example, when the first device 1400 performs the methods described with reference to FIGS. 7 to 13, each signal and/or message may be transmitted and received using the transmitter and/or the receiver of the RF unit and each operation may be performed under the control of the processor.

Although not shown in FIG. 14, the first device 1400 may further include various additional components according to an application type of the device. For instance, if the first device 1400 is an intelligent meter, the first device 1400 may further include an additional component for power measurement. Such a power measurement operation may be controlled by the processor 1420 or a separately configured processor (not shown in the drawing).

For example, the second device 1450 may correspond to a base station. In this case, the transmitter 1461 and the receiver 1462 of the base station are configured to transmit and receive signals to and from another base station, a D2D server, and D2D devices. The processor 1470 is functionally connected to the transmitter 1461 and the receiver 1462 and may be configured to control a process of, at the transmitter 1461 and the receiver 1462, transmitting and receiving signals to and from other devices. In addition, the processor 1470 performs various processing on a signal to be transmitted and then transmits the signal to the transmitter 1461. Moreover, the processor 1420 may also perform processing on a signal received by the receiver 1462. If necessary, the processor 1470 may store information included in an exchanged message in the memory 1430. The base station with the aforementioned structure may perform the methods according to the various embodiments described above.

In FIG. 14, the processors 1420 and 1470 of the first and second devices 1410 and 1450 instruct (e.g., control, adjust, and manage) the operations of the first and second devices 1410 and 1450, respectively. The processors 1420 and 1470 may be connected to the memories 1430 and 1480 that store program codes and data. The memories 1430 and 1480 are connected to the processors 1420 and 1470 and store an operating system (OS), an application, and general files.

The processors 1420 and 1470 of the present invention may be referred to as controllers, microcontrollers, microprocessors, microcomputers, etc. The processors 1420 and 1470 may be implemented by hardware, firmware, software, or a combination thereof. In a hardware configuration, the processors 1420 and 1470 may include application specific integrated circuits (ASICs), digital signal processors (DSPs), digital signal processing devices (DSPDs), programmable logic devices (PLDs), field programmable gate arrays (FPGAs), etc. that are configured to implement the present invention.

In a firmware or software configuration, firmware or software may be implemented in the form of a module, a procedure, a function, etc. for performing the above-described functions or operations of the present invention. The firmware or software configured to implement the present invention may be included in the processors 1420 and 1470 or stored in the memories 1430 and 1480 and executed by the processors 1420 and 1470.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to implement the embodiments of the present invention. The order of operations described in the embodiments of the present invention may be changed. Some structural elements or features of one embodiment may be included in another embodiment, or may be replaced with corresponding structural elements or features of another embodiment. Moreover, it is apparent that an embodiment is configured by combining claims failing to have relation of explicit citation in the appended claims together or can be included as new claims by amendment after filing an application.

It will be apparent to those skilled in the art that the present invention may be embodied in other specific forms without departing from the spirit and essential characteristics of the invention. Thus, the above embodiments should be considered in all respects as exemplary and not restrictive. The scope of the present invention should be determined by reasonable interpretation of the appended claims and the present invention covers the modifications and variations of this invention that come within the scope of the appended claims and their equivalents.

INDUSTRIAL APPLICABILITY

The aforementioned embodiments of the present invention can be applied to various wireless mobile communication systems.

What is claimed is:

1. A method for transmitting scheduling assignment (SA) information between half-duplex user equipments (UEs) in a wireless communication system, the method performed by a first UE and comprising:
   receiving a plurality of SA information for the first UE from a plurality of UEs;
   determining that SA information for transmission to a second UE and SA information transmitted from the second UE are included in the received plurality of SA information;
   determining that the second UE is in a same group with the first UE; and
   transmitting the SA information for transmission to the second UE to the second UE,
   wherein the first UE is a UE nearest the second UE among the plurality of UEs, and
   wherein the SA information is transmitted a number of times within a predetermined period, the number of times determined based on a measured power of the SA information transmitted from the second UE.

2. The method of claim 1, wherein the SA information for the second UE is further transmitted based on a predetermined probability.

3. The method of claim 1, wherein the SA information for the second UE is further transmitted when a value obtained by a modular operation for an identifier of the first UE and a value obtained by a modular operation for an identifier of the second UE are equal.

4. The method of claim 1, wherein each of the received plurality of SA information includes information for a target UE, resource information used for transmitting data to the target UE, and information for demodulating the data.

5. The method of claim 1, wherein the received plurality of SA information is broadcast.

6. A method for transmitting scheduling assignment (SA) information between half-duplex user equipments (UE) in a wireless communication system, the method performed by a first UE and comprising:
   receiving a plurality of SA information for the first UE from a plurality of UEs;
   determining that SA information for transmission to a second UE and SA information transmitted from the second UE are included in the plurality of SA information;
   determining that the second UE is in a same group with the first UE; and
   transmitting an identifier (ID) of the second UE to a third UE from which the SA information for transmission to the second UE was received,
   wherein the first UE is a UE nearest the second UE among the plurality of UEs, and wherein the ID is transmitted a number of times within a predetermined period, the number of times determined based on a measured power of the SA information transmitted from the second UE.

7. The method of claim 6, further comprising receiving a re-transmission of the SA information for the second UE from the third UE after transmitting the ID of the second UE.

8. The method of claim 6, wherein each of the received plurality of SA information includes information for a target UE, resource information used for transmitting data to the target UE, and information for demodulating the data.

9. The method of claim 6, wherein the received plurality of SA information is broadcast.

10. A first user equipment (UE) for supporting transmission of scheduling assignment (SA) information between half-duplex UEs in a wireless communication system, the first UE comprising:
   a radio frequency unit configured to transmit and receive signals; and
   a processor is configured to:
     control the RF unit to receive a plurality of SA information for the first UE from a plurality of UEs;
     determine that SA information for transmission to a second UE and SA information transmitted from the second UE are included in the received plurality of SA information;
     determine that the second UE is in a same group with the first UE; and
     control the RF unit to transmit the SA information for transmission to the second UE to the second UE,
   wherein the first UE is a UE nearest the second UE among the plurality of UEs, and
   wherein the SA information is transmitted a number of times within a predetermined period, the number of times determined based on a measured power of the SA information transmitted from the second UE.

11. The first UE of claim 10, wherein the SA information for the second UE is further transmitted based on a predetermined probability.

12. The first UE of claim 10, wherein the SA information for the second UE is further transmitted when a value obtained by a modular operation for an identifier of the first UE and a value obtained by a modular operation for an identifier of the second UE are equal.

13. The first UE of claim 10, wherein each of the received plurality of SA information includes information for a target UE, resource information used for transmitting data to the target UE, and information for demodulating the data.

14. The first UE of claim 10, wherein the received plurality of SA information is broadcast.

* * * * *